(12) United States Patent
Claerhout et al.

(10) Patent No.: US 7,585,213 B2
(45) Date of Patent: Sep. 8, 2009

(54) AUGER TROUGH CLEAN-OUT DOOR

(75) Inventors: Bryan S. Claerhout, Hesston, KS (US); Robert A. Matousek, Milan, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/009,438

(22) Filed: Jan. 18, 2008

(65) Prior Publication Data

US 2009/0186674 A1    Jul. 23, 2009

(51) Int. Cl.
*A01B 71/08* (2006.01)
(52) U.S. Cl. ...................................... 460/103
(58) Field of Classification Search ............... 460/103, 460/93, 66, 70, 90, 99, 100; 56/119
See application file for complete search history.

(56) References Cited

U.S. PATENT DOCUMENTS

| | | | | |
|---|---|---|---|---|
| 2,180,681 | A | | 11/1939 | Johnson ...................... 198/213 |
| 2,743,728 | A | * | 5/1956 | Carlson ....................... 460/109 |
| 2,886,902 | A | | 5/1959 | Christian ...................... 34/179 |
| 2,896,291 | A | | 7/1959 | Gidlow ......................... 24/248 |
| 3,101,721 | A | * | 8/1963 | Fuller ........................... 460/75 |
| 3,470,881 | A | * | 10/1969 | DePauw et al. .............. 460/109 |
| 3,537,460 | A | | 11/1970 | Van Buskirk ................ 130/27 |
| 3,568,863 | A | | 3/1971 | Rohwedder ................ 214/83.32 |
| 3,913,589 | A | * | 10/1975 | Rouse et al. ................... 460/90 |
| 4,090,604 | A | | 5/1978 | Reifert ......................... 198/861 |
| 4,128,160 | A | | 12/1978 | Deal et al. ................... 198/657 |
| 4,466,447 | A | * | 8/1984 | Hoefer et al. .................. 460/13 |
| 4,884,994 | A | | 12/1989 | Hall et al. ..................... 460/66 |
| 5,797,480 | A | | 8/1998 | Gaddis et al. ............... 198/672 |
| 6,367,234 | B1 | * | 4/2002 | Hurlburt ....................... 56/16.6 |
| 6,602,130 | B1 | * | 8/2003 | Manning et al. ............ 460/100 |
| 6,758,745 | B2 | * | 7/2004 | Van Der Haegen et al. . 460/109 |
| 7,297,051 | B1 | | 11/2007 | Schmid et al. ................ 460/93 |

(Continued)

FOREIGN PATENT DOCUMENTS

EP        0112931        7/1984

*Primary Examiner*—Árpád Fábián-Kovács
(74) *Attorney, Agent, or Firm*—Michael G. Harms; John William Stader; Patric M. Sheldrake

(57) ABSTRACT

An auger trough and associated clean-out door construction of a clean grain and tailings conveying system for an agricultural combine, such construction including a pair of spaced, depending auger trough side walls that extend laterally across a combine between opposed sidesheets, with a removable door panel positionable across the combine between the opposed sidesheets and between said auger trough side walls to form an auger trough base, which door panel is configured to be so engageable with the auger trough side walls to substantially close the bottom of the auger trough and whose opposite ends are configured to be complementarily engageable with engagement features associated with the sidesheets to maintain such door panel in place during harvesting operations and, with such auger trough side walls, to define a generally rigid trough between the opposed sidesheets. Preferably, the door panel has a first end configured to be engageable with and to rest upon a projecting flange on a first of the opposite sidesheets and a second, latch end with an associated latch mechanism for engaging a complementary latching feature on the second, of the opposed sidesheets for generally securing the door panel in position as the bottom of the auger trough.

20 Claims, 13 Drawing Sheets

U.S. PATENT DOCUMENTS

| | | | |
|---|---|---|---|
| 7,395,650 B2 * | 7/2008 | Mossman et al. | 56/119 |
| 2003/0216159 A1 * | 11/2003 | Van Der Haegen et al. | 460/107 |
| 2004/0106442 A1 | 6/2004 | Manning et al. | 460/70 |
| 2004/0184905 A1 * | 9/2004 | Kinzenbaw et al. | 414/526 |
| 2006/0025188 A1 | 2/2006 | Schmidt et al. | 460/114 |
| 2007/0186531 A1 * | 8/2007 | Mossman et al. | 56/119 |

* cited by examiner

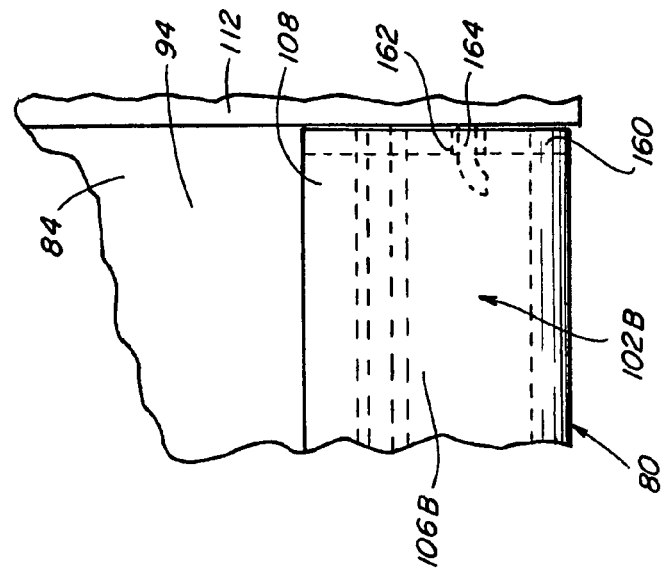
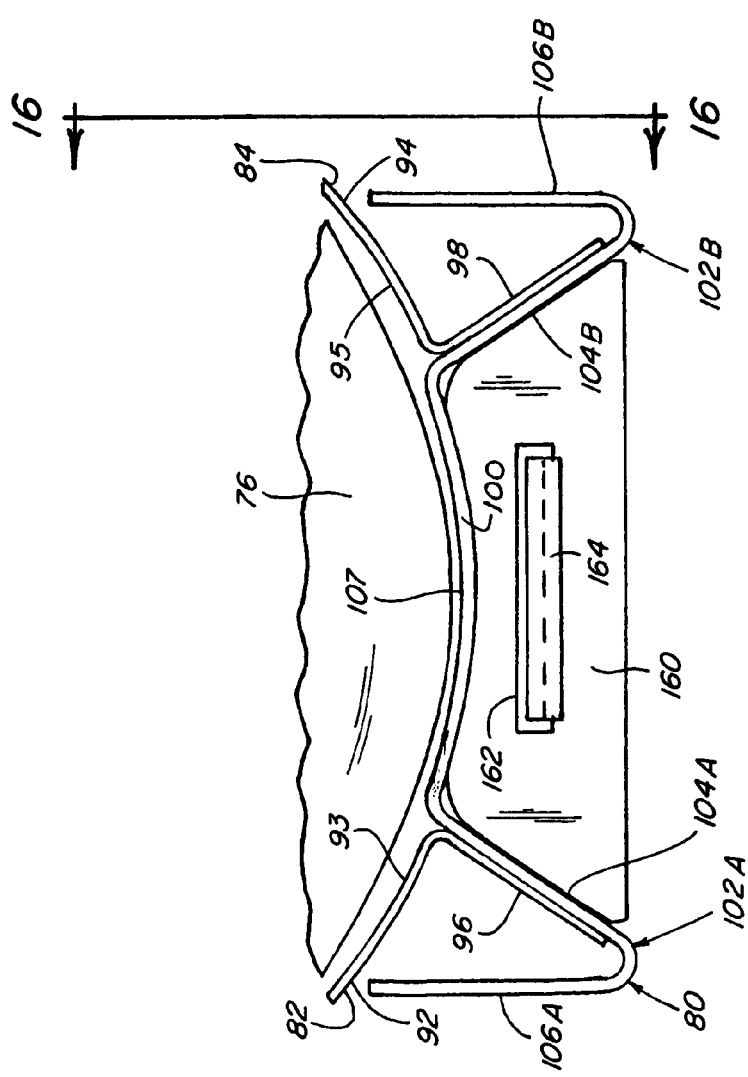

AUGER TROUGH CLEAN-OUT DOOR

TECHNICAL FIELD

This invention relates generally to clean grain and tailings conveying systems of agricultural combines and to a construction for facilitating the clean out of the auger troughs of such systems, and, more particularly, to an auger trough and associated auger trough clean-out door for such systems.

BACKGROUND ART

In the harvesting of crops it is desired that the grain be separated from other elements or portions of the crop, such as from pod or cob fragments, straw, stalks, and the like. Agricultural combines typically have employed a rotary threshing or separating system for separating and segregating the grain from such other crop elements or portions. Typical of such rotary threshing or separating systems are constructions such as those described and depicted in Van Buskirk U.S. Pat. No. 3,537,460, issued to International Harvester Company, and Hall et al. U.S. Pat. No. 4,884,994, issued to Deere and Company. In general, rotary threshing or separating systems are so designed that, as threshing occurs, the resulting crop material is typically caused to fall directly onto an underlying vibratory cleaning system or onto one or more conveyors for conveyance to a cleaning system for further processing.

The cleaning system typically includes a set of stacked sieves or shoes that are reciprocally moved, usually in the fore and aft directions, to separate or sift the grain from tailings and material other than grain (MOG). With many combines, as the grain is cleaned from the MOG, it falls through the sieves and drops onto or into one or more underlying clean grain pans that are disposed below the sieves, which pans typically include a plurality of elongated and longitudinally oriented clean grain collecting troughs positioned side-by-side across at least a portion of the width of the combine to receive the clean grain that falls through the set of sieves. Such collecting troughs are configured to receive the grain falling therein and to convey such grain therethrough towards an intersecting, cross, generally laterally extending, clean grain conveyance trough, sometimes referred to as the clean grain auger trough.

The laterally extending clean grain conveyance trough receives the clean grain conveyed thereto from the clean grain collecting troughs and typically has associated therewith a conveyance mechanism, often in the form of an auger extending therethrough, for moving and delivering the clean grain in such clean grain conveyance trough to an elevator that carries the clean grain up to a clean grain tank. For convenience of reference, the clean grain conveyance trough will generally hereinafter be referred to as the clean grain auger trough regardless of the particular conveyance mechanism that may be employed therewith for moving the clean grain through such trough, and it should be recognized and understood that such appellation is not intended to indicate or require that an auger must necessarily be employed therein or associated with such trough.

During the vibration of the sieves, air is blown upwardly and rearwardly through the sieves to carry lighter elements of the MOG, or chaff, away. The heavier elements and tailings that are too large to fall through the sieves and too heavy to be blown away are caused to be moved by the vibrations, generally rearwardly along the top surfaces of the sieves, towards and over rear edges of the sieves to fall onto a tailings pan located below and extending somewhat beyond such rear edges. The tailings pan, similarly to the clean grain pan, typically includes a plurality of elongated and longitudinally oriented tailings collecting troughs positioned side-by-side across at least a portion of the width of the combine to receive the tailings that fall thereinto from the rear edges of the sieves. Such collecting troughs are configured to receive the tailings therein and to convey such tailings therethrough towards an intersecting, cross, generally laterally extending, tailings conveyance trough, sometimes referred to as the tailings auger trough.

The sidewardly extending tailings conveyance trough receives the tailings conveyed thereto from the tailings collecting troughs and has a conveyance mechanism, often in the form of an auger extending therethrough, for moving and delivering the tailings to a tailings return conveyor operable for carrying the tailings upwardly, back to the cleaning or separating system of the combine, for reprocessing. For convenience of reference, the tailings conveyance trough will generally hereinafter be referred to as the tailings auger trough regardless of the particular conveyance mechanism that may be employed therewith for moving the tailings through such trough, and it should be recognized and understood that such appellation is not intended to indicate or require that an auger must necessarily be employed therein or associated with such trough.

Although conveyance mechanisms associated with the clean grain auger trough and the tailings auger trough, such as augers disposed in such clean grain auger trough and in the tailings auger trough, are generally effective in conveying the clean grain and tailings through the respective clean grain auger trough and the tailings auger trough and for emptying the clean grain and tailings from such auger troughs, remnants of such materials, as well as dirt and other residue, can build up over time along the bottoms and edges of the auger troughs and at locations beyond the reach of the augers that extend through such auger troughs, especially when moisture is introduced into such auger troughs and/or such remnants remain in the troughs as they are exposed to weather extremes. It is desirable to be able to remove as much of such remnants as possible, especially from the clean grain auger trough, to avoid in subsequent harvesting operations the mixture into the newly harvested grain of grain from an earlier harvesting and to avoid the fouling of the auger or other conveyance mechanisms in the auger troughs.

In some combines and with some auger troughs, the ability to clean out the troughs has been essentially limited to the introduction or direction of a pressurized stream of water into the end of an auger trough to try to wash out the remnants remaining therein, with modest success. In order to secure a better clean out of auger troughs, some users began to cut holes into the bottoms of the auger troughs, generally of limited size and somewhat centered along the length of troughs, to provide an access point for the introduction of pressurized streams of water or air and to permit access through such holes for manual clean out of at least some of the remnant material. After the accomplishment of such clean out as could reasonably be made, the holes were sealed with plates mounted to the troughs to cover the holes during the subsequent operation of the combines. By configuring the plates to be removable and reinstallable, such users effectively modified the troughs to include panels or doors along the undersides of the troughs to facilitate the better removal of crop and other remnants therefrom.

More recently, some combines have been designed to include auger troughs that include engineered doors along portions of the bottoms of the troughs, generally approximately centered along the length of the troughs and designed to provide a tighter and more uniform fit than was true with the user-crafted panels. By removing, from beneath the combines, bolts or like connector assemblies securing the doors to the troughs, a user could remove the doors to permit cleaning activities and could later reinstall such doors, again from beneath the combines, by properly matching and positioning the doors to the openings therefor along the underside of the troughs, pushing the doors into place, and reconnecting the bolts or like connector assemblies.

Even with such engineered clean-out doors, clean out of the clean grain auger troughs and the tailings auger troughs has remained problemsome due to the difficulties associated with the removal and reinstallion of such doors, due in part to the location of such doors beneath the combine and the necessity for accessing them from beneath the combine, and to the limited accessibility to certain areas along the troughs even when the doors have been removed. Since such doors have encompassed only a portion of the undersides of the troughs, even when such doors have been removed for clean out activities, remnants of crop and other materials could remain at the ends of the troughs and at other areas along the troughs that are not located above the door locations or to which there would be only limited, if any, accessibility through such doors.

Consequently, the clean out of auger troughs, and the ability to achieve the desired effective cleaning, has remained a concern for combine users.

SUMMARY OF THE INVENTION

What is now disclosed is a construction for facilitating the clean out of the auger troughs of clean grain and tailings conveying systems of agricultural combines. Such construction employs an auger trough with an associated auger trough clean-out door that extends substantially the entire length of the auger trough, which door can be readily removed and reinstalled from the sides of the combine without cumbersome access to the underside of the combine, and obviates one or more of the problems set forth above.

According to a preferred aspect of the invention, what is disclosed is an auger trough and associated clean-out door construction that can be utilized in a clean grain and tailings conveying system for an agricultural combine in place of previous clean grain auger troughs and tailings auger troughs. Such construction includes a pair of spaced, depending walls defining a channel therebetween that is open at its top to receive material falling thereinto, such as from collecting troughs extending generally transverse to such channel, which side walls extend laterally across a combine between opposed sidesheets, with a removable door panel positionable between said side walls to form a base of the channel, which door panel likewise extends laterally across the combine between the opposed sidesheets. Such door panel is configured to be engageable with the side walls to substantially close the bottom of the channel and has opposite ends that are configured to be generally securable when the door panel is in position between the sidewalls and the sidesheets to maintain such door panel in place during harvesting operations and to define a generally rigid trough between the opposed sidesheets.

Preferably, the opposite ends of such door panel are configured to be complementarily engageable with the opposed sidesheets to maintain such door panel in position across the combine between the opposed sidesheets. In one preferred embodiment, the door panel has a first, free end configured to be engageable with and to rest upon a projecting flange on a first of the opposite sidesheets and a second, latch end with an associated latch mechanism for engaging a complementary latching feature on the second of the opposed sidesheets for generally securing the door panel in position along the bottom of the trough.

By operating the latching mechanism associated with the latch end of the door panel, the door panel can be released from its securement with the second of the opposed sidesheets and such latch end can be rotated downwardly to permit disengagement of the free end from the projecting flange of the first opposed sidesheet and the removal of the door panel. The door panel can be cleaned, and scraped, if necessary, to remove any remnants adhering thereto or encrusted thereupon. When the door panel is removed, remaining loose remnants within the trough will be allowed to fall to the ground, and further cleaning, including by the use of pressurized streams of water or air or by scraping action to remove severe build-up, of the side walls then can be more readily and effectively effected than was true of previous constructions.

Such door panel embodiment can be readily reinstalled by positioning the free end of the door panel to rest upon the projecting flange on the first opposed sidesheet, rotating the latch end of the door panel upwardly to engage the side walls and to position the latching mechanism and the latching feature for engagement with one another, and operating the latching mechanism to secure the door panel in place.

With such a construction, the removal and reinstallation of the door panel can be quickly and easily effected from the side of the combine, rather than requiring a user to access the underside of the combine and to engage in cumbersome activities in uncomfortable positions, and better clean out of the trough can be can be realized.

BRIEF DESCRIPTION OF THE DRAWINGS

FIG. 15 is a view similar in some respects to FIG. 8, but illustrating the use of alternative complementary engagement and mating features and elements of the clean-out door and the sidesheet at the same end of the clean-out door as depicted in FIG. 8.

FIG. 16 is a side view taken along cut 16-16 of FIG. 15.

DETAILED DESCRIPTION OF THE INVENTION

Figure 1:
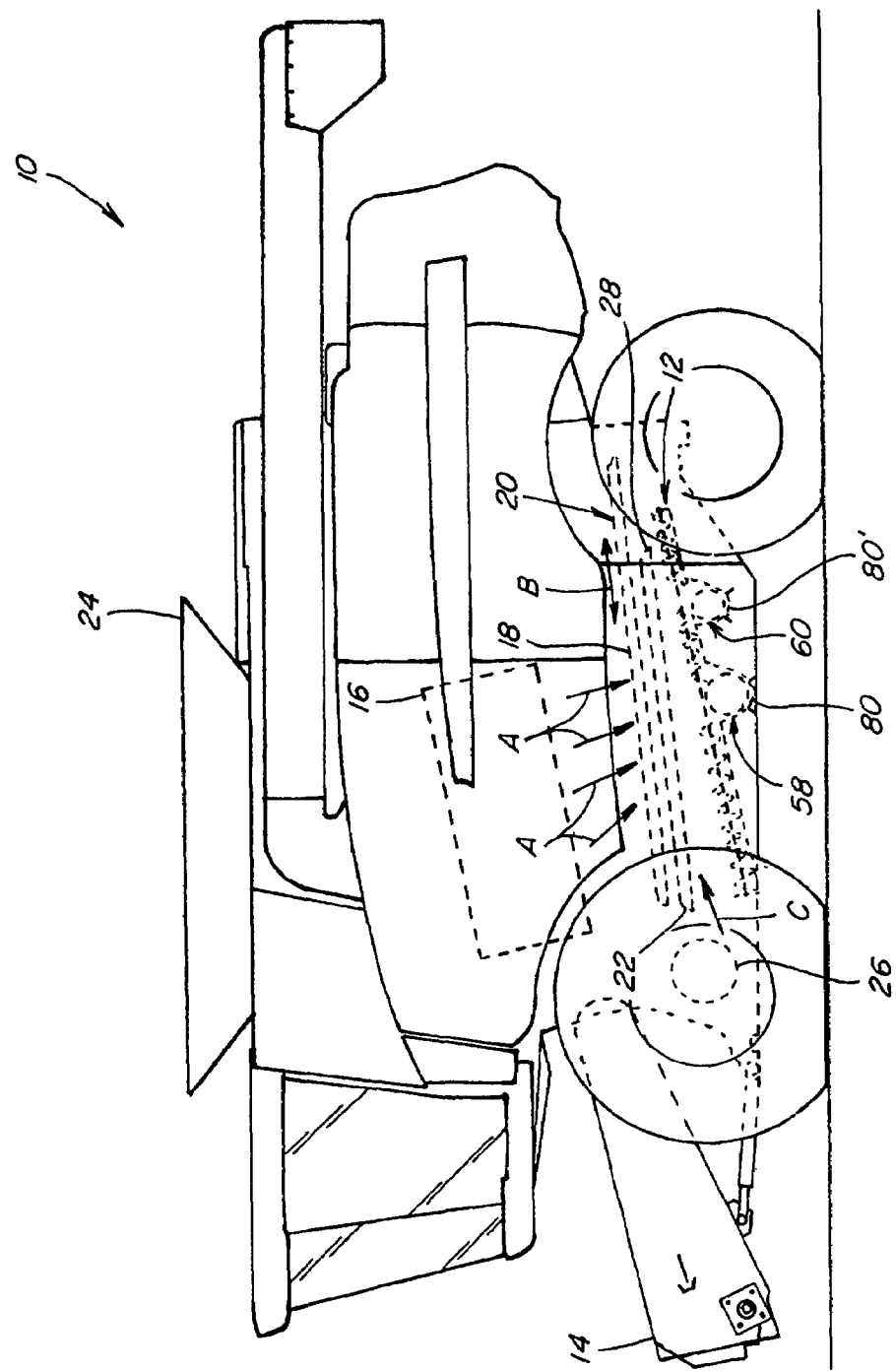
FIG. 1 is a simplified side view of an agricultural combine including one form of a clean grain and tailings conveying system, wherein the tailings pain is effectively joined to the clean grain pan to be a rearward extension thereof, with the collecting troughs that feed to the clean grain and tailings auger troughs generally residing in the same inclined plane, and wherein the clean-grain auger trough and tailings auger trough constructions have associated therewith auger trough clean-out doors according to the present invention.
Figure 2:
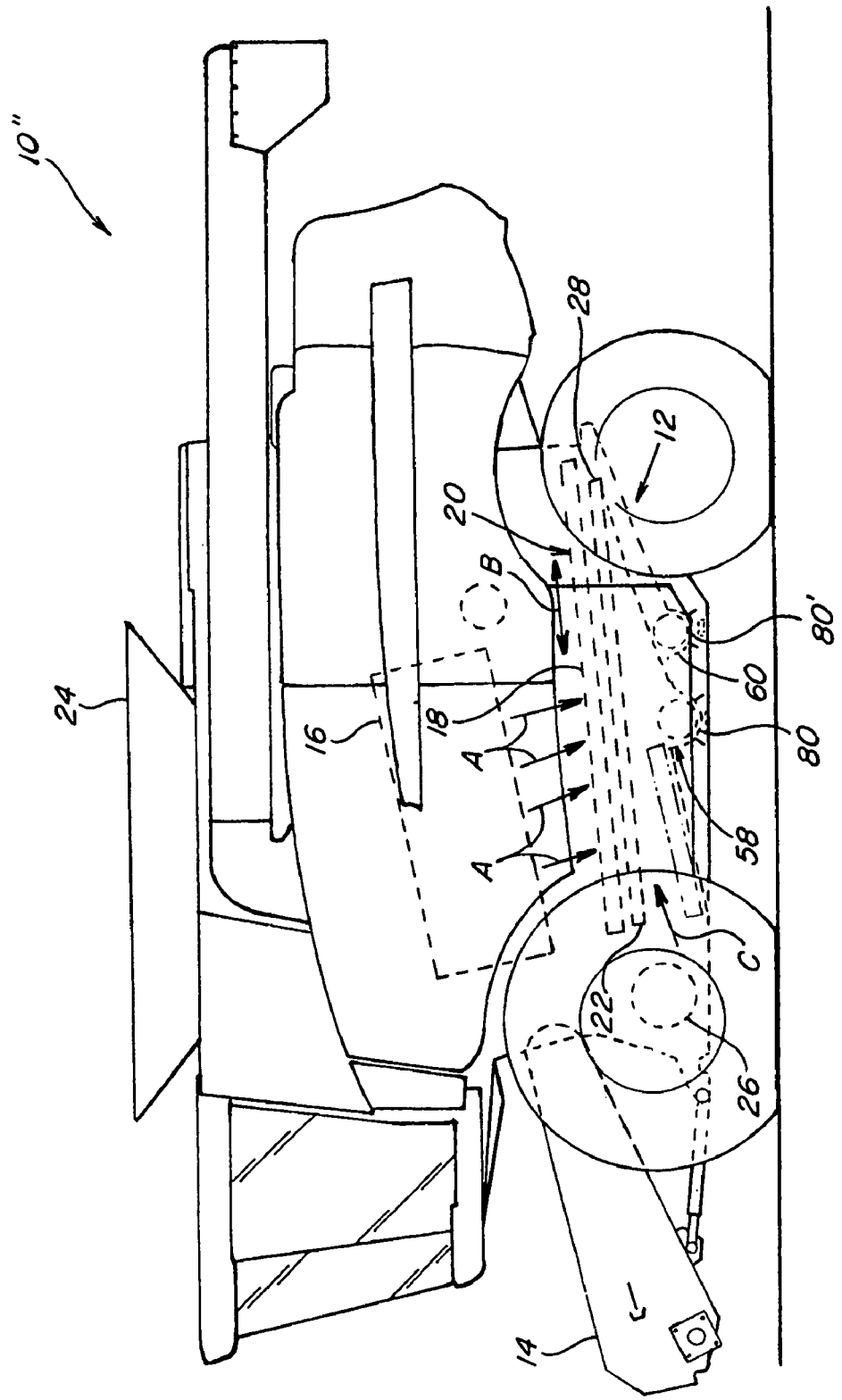
FIG. 2 is a simplified side view of an agricultural combine including a somewhat different form of clean grain and tailings conveying system, wherein the tailings pan and the clean grain pan are separate pans, with the collecting troughs that feed to the clean grain and tailings auger troughs residing in different inclined planes, and wherein the clean grain auger trough and tailings auger trough constructions have associated therewith auger trough clean-out doors according to the present invention.

Referring now to the drawings, wherein like numbers refer to generally like items or features, FIGS. 1 and 2 depict generally similar agricultural combines 10 and 10" that include similar, but somewhat different, respective clean grain and tailings conveying systems 12 and 12", each of which conveying systems 12 and 12" include clean grain auger trough and tailings auger trough constructions that have associated therewith auger trough clean-out doors according to the present invention.

Combines 10 and 10" are of conventional, well known construction, each including a feeder house 14 on a front end thereof, to which is connectable a header (not shown), operable to sever a swath of crops from a field as the combine is moved forwardly thereover and to convey the severed crops to feeder house 14. Feeder house 14 includes an internal conveying system (not shown), for conveying the crops upwardly and rearwardly into the bodies of the combines 10 and 10", into an inlet of a separating or threshing system 16 of the combines. Threshing system 16 generally includes a rotary rotor at least partially enclosed in a concave defining an arcuate space therebetween, and in which space the crop material is processed, for separating grain, and material other than grain (MOG), from straw, with the straw being ejected rearwardly from the threshing system through the rear end of the combine for deposit on the field, in the well known manner.

As threshing system 16 operates, crop material will fall, and/or be conveyed, therefrom, as denoted generally by arrows A, onto an upper sieve 18 of a cleaning system 20 located below threshing system 16 within the body of combines 10 and 10". Such cleaning system 20 also includes a lower sieve 22 positioned below upper sieve 18 in a stacked relationship therewith, and the sieves 18 and 22 are configured to be reciprocally moved or vibrated relative to one another to effect a sifting of material falling onto the upper sieve 18.

As the crop material from the threshing system 16 falls onto upper sieve 18, air from a fan 26 is blown upwardly and rearwardly through sieves 18 and 22. The combination of this air flow and the vibratory movement of the sieves 18 and 22 causes the lighter elements of the MOG, referred to also as chaff, to be blown upwardly and rearwardly away from sieves 18 and 22. Such chaff is typically blown into an optional chaff spreader (not shown), operable for distributing the chaff over a desired swath of the field from which the crop is cut, or directed into an optional chopper (also not shown), operable for mixing the chaff with straw for chopping and distributing such mix, or simply directed downwardly onto the field through a rear opening of the combine, all of which operations can be effected in well known manners.

Upper sieve 18 includes openings therethrough that are sized to allow separated grain as well as some smaller elements of MOG, sometimes referred to as tailings, to pass therethrough and to fall onto lower sieve 22 of the cleaning system 20, thus sifting the separated grain and tailings from larger elements of MOG. The larger elements of MOG that are unable to pass through upper sieve 18 are moved to the rear peripheral edge portion of such sieve by the vibratory movements of such sieve to fall thereover, either directly onto the underlying field or onto or into other apparatus for further processing, including chopping and/or spreading. Such further processing of such larger elements of MOG may be accomplished in various well known manners by well known equipment (not shown).

Lower sieve 22 has smaller openings therethrough than upper sieve 18, such that the sieves 18 and 22 will act as a progressive sifting or cleaning mechanism for separating and cleaning grain from the tailings that were also able to pass through sieve 18. To facilitate such sifting action and the flow of grain through the stacked sieves 18 and 22, such sieves are vibrated or reciprocally moved, typically in a fore and aft direction, as denoted by arrow B. The grain that falls through lower sieve 22 into clean grain and tailings systems 12 and 12' of combines 10 and 10' is considered to be clean grain that is desired to be collected and ultimately conveyed to a grain tank 24. The tailings that are allowed to pass through the upper sieve 18 often may still contain some unseparated grain, and retention of such tailings for further processing thereof to effect separation of the grain therefrom is generally desired. Such tailings, which are unable to pass through the smaller openings on lower sieve 22, are caused to move towards a rear peripheral edge portion 28 of sieve 22, and to fall thereover, by the vibratory movement of lower sieve 22, into clean grain and tailings systems 12 and 12" of combines 10 and 10" for further processsing.

Figure 3:
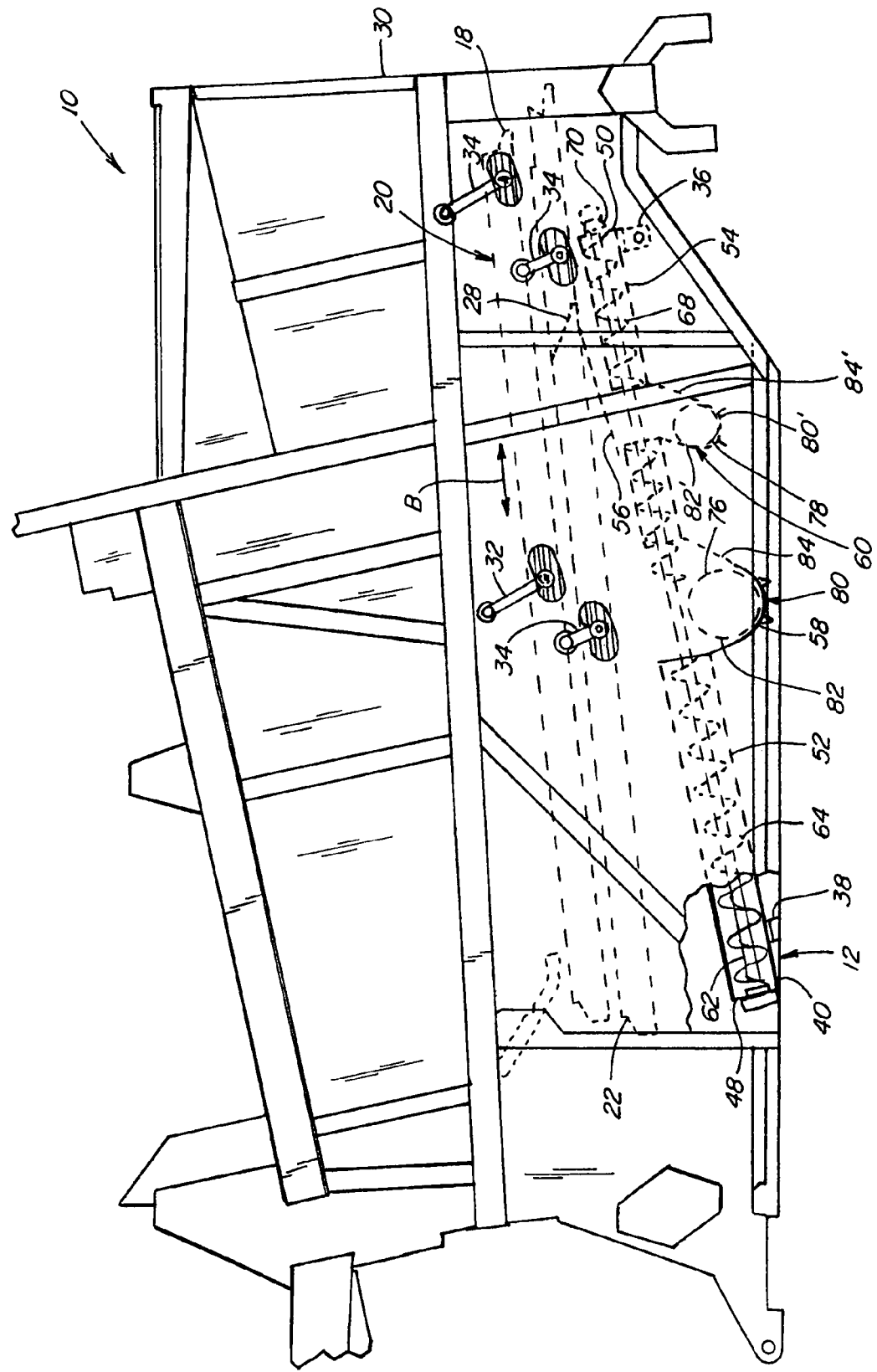
FIG. 3 is a simplified side view of a structural frame of the combine of FIG. 1, depicting in greater detail the conveying system of such combine and the mounting thereof in connection with the frame.
Figure 4:
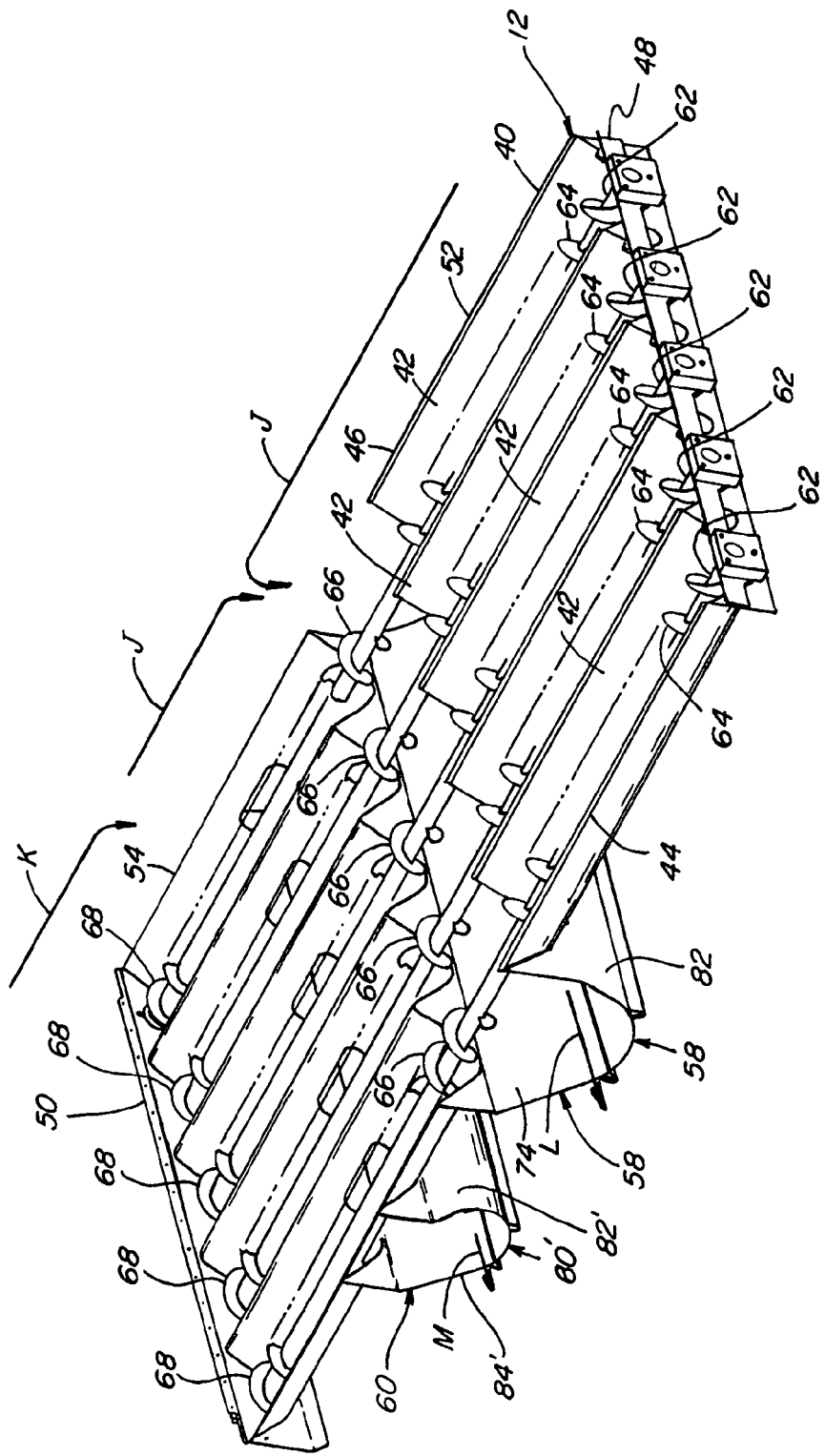
FIG. 4 is a partial perspective view of the clean grain and tailings conveying system of FIG. 1, depicting in greater detail the positioning of the collecting troughs and the clean grain auger trough and tailings auger trough relative to one another.
Figure 5:
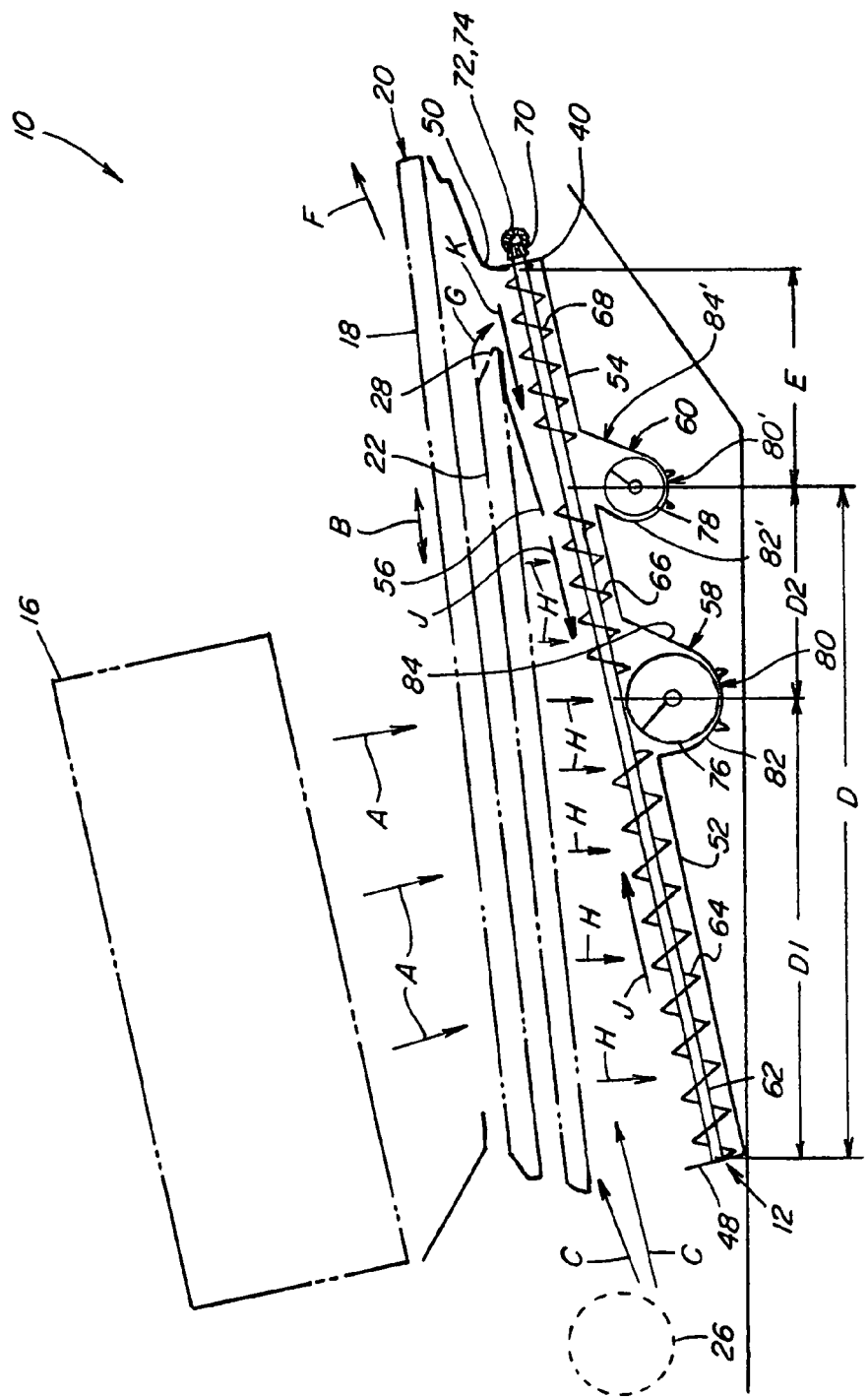
FIG. 5 is simplified side view of elements of the conveying system of FIGS. 1 and 3-4.

FIGS. 3-5 depict in greater detail certain elements of the cleaning system 20 as well as further details of the clean grain and tailings conveying system 12 of FIG. 1. In such regard, FIG. 3 illustrates the manner in which sieves 18 and 22 may be suspended from a structural frame 30 of combine 10 by pivoting support arms 32 and 34, respectively, for reciprocal fore and aft movement. Such movement, as denoted by arrow B, may be readily effected by various suitable and well known drive mechanisms (not shown) that operate in well known manners. Clean grain and tailings conveying system 12 is depicted as being fixedly connected or mounted below lower sieve 22 of cleaning system 20 to structural frame 30 by brackets 36 and 38, so as to be immovable relative to structural frame 30.

FIGS. 3-5 also illustrate the construction and operation of the clean grain and tailings conveying system 12 of FIG. 1. Such conveying system 12 generally includes a pan 40 that is fixedly mounted to structural frame 30 by brackets 36 and 38, so as to be located directly beneath lower sieve 22 of cleaning system 20 and, for reasons that will become evident hereinafter, to extend beneath and beyond peripheral edge portion 28 of lower sieve 22 (FIG. 3).

As best shown in FIG. 4, pan 40 preferably includes a plurality or array of elongated, longitudinally extending collecting troughs 42 positioned side-by-side to another across the width of pan 40. Such collecting troughs 42 preferably extend in the fore and aft direction, between a forward edge 48 of pan 40, and a rear edge 50. Each such collecting trough 42 has a clean grain receiving portion 52, located beneath those regions of lower sieve 22 through which clean grain is expected to fall, and a tailings receiving portion 54, positioned extending directly beneath peripheral edge portion 28 of lower sieve 22 (FIG. 3).

As may be better observed from FIG. 5, clean grain receiving portion 52 has an overall fore and aft extent D, as denoted by arrow D, and tailings receiving portion 54 has an overall fore and aft extent E, as denoted by arrow E. The extent of clean grain receiving portion 52 is further subdivided into a forward clean grain receiving region, generally having a fore and aft extent denoted D1, and a rear clean grain receiving region, having an extent D2.

The portion D of the pan 40 that includes the clean grain receiving portions 52 of the collecting troughs 42 is sometimes considered to be or referred to as the clean grain pan and the portion E of the pan 40 that includes the tailings receiving portion 54 is sometimes considered to be or referred to as the tailings grain pan. The portions of the collecting troughs in the clean grain pan are then sometimes considered to be or referred to as clean grain collecting troughs while the portions of the collecting troughs in the tailings pan are then sometimes considered to be or referred to as tailings collector troughs.

Recapitulating, with particular reference to FIG. 5, as grain and MOG flows downwardly from threshing system 16 onto upper sieve 18 during a harvesting operation, with such flow being denoted generally by arrows A, upper sieve 18 and lower sieve 22 are reciprocally moved, as denoted by arrow B, for the purpose of sifting and cleaning grain from MOG. Simultaneously, fan 26 operates to generate upward and rearward air flows, denoted by arrows C, which blow through the openings through sieves 18 and 22 to carry chaff rearwardly, away from cleaning system 20, as denoted by arrow F.

As such actions occur, tailings are allowed to pass through the openings of upper sieve 18, but not those of lower sieve 22. The tailings are moved by vibration rearwardly along the surface of lower sieve 22, until they reach peripheral edge portion 28, which is the rear edge of lower sieve 22, where such tailings fall therefrom, as denoted by arrow G. Those tailings fall onto tailings receiving portion 54 of pan 40, which is located directly below edge portion 28.

Meanwhile, clean grain is allowed to pass through lower sieve 22, as denoted by arrows H, so as to fall onto clean grain receiving portion 52 of pan 40. Some of the clean grain will typically fall onto clean grain receiving portion 52 in the forward region D1, and some will fall in the rear region D2. A deflector shield 56 is preferably disposed beneath the rear end portion of lower sieve 22 to deflect clean grain which falls therethrough forwardly, so as to fall onto clean grain receiving portion 52 of pan 40, as opposed to tailings receiving portion 54 located below the rear end.

Clean grain auger trough 58 is disposed generally cross-wise to and in communication with the clean grain collecting troughs of clean grain receiving portion 52 such that clean grain can be conveyed through the clean grain collecting troughs to the clean grain auger trough, and tailings auger trough 60 is disposed generally cross-wise to and in communication with the tailings collector troughs of tailings receiving portion 54. An elongated, helical auger 62 is supported in each collecting trough 42, so as to extend longitudinally in the fore and aft directions therealong, continuously through both the clean grain receiving portion 52 and the tailings receiving portion 54. Each auger 62 includes a first helical auger flight 64 extending in a first predetermined direction therearound through the forward clean grain receiving portion D1 of pan 42 and a second helical auger flight 66 extending in a second rotational direction therearound, opposite the first rotational direction, through the region D2 and through the tailings receiving portion 54. Each auger 62 is connected to a drive mechanism operable for rotating it, here the mechanism being illustrated as including a bevel gear 70 on the rear end of auger 62, which gear is enmeshed with a bevel gear 72 on a drive shaft 74 which extends sidewardly across the rear end of pan 40, so as to jointly rotate augers 62. Drive shaft 74 can be rotated by any suitable drive, such as, but not limited to, a belt, chain or shaft, in connection with a power plant of combine 10 (not shown).

When augers 62 are rotated in a predetermined rotational direction, flights 64, 66, and 68 will convey clean grain and tailings separately and simultaneously along collecting troughs 42, with clean grain from the clean grain collecting troughs being moved into clean grain auger trough 58 and tailings from the tailings collector troughs being moved into tailings auger trough 60, as denoted by respective arrows J and K. Clean grain auger trough 58 preferably has a helical auger 76 associated therewith and tailings auger trough 60 preferably has a similar auger 78 associated therewith, which augers are rotatable in the conventional manner using suitable drives (not shown) for conveying the clean grain and tailings, respectively, to a clean grain elevator (not shown) and a tailings return system (also not shown), in well known manners, as denoted by arrows L and M in FIG. 4.

Figure 6:
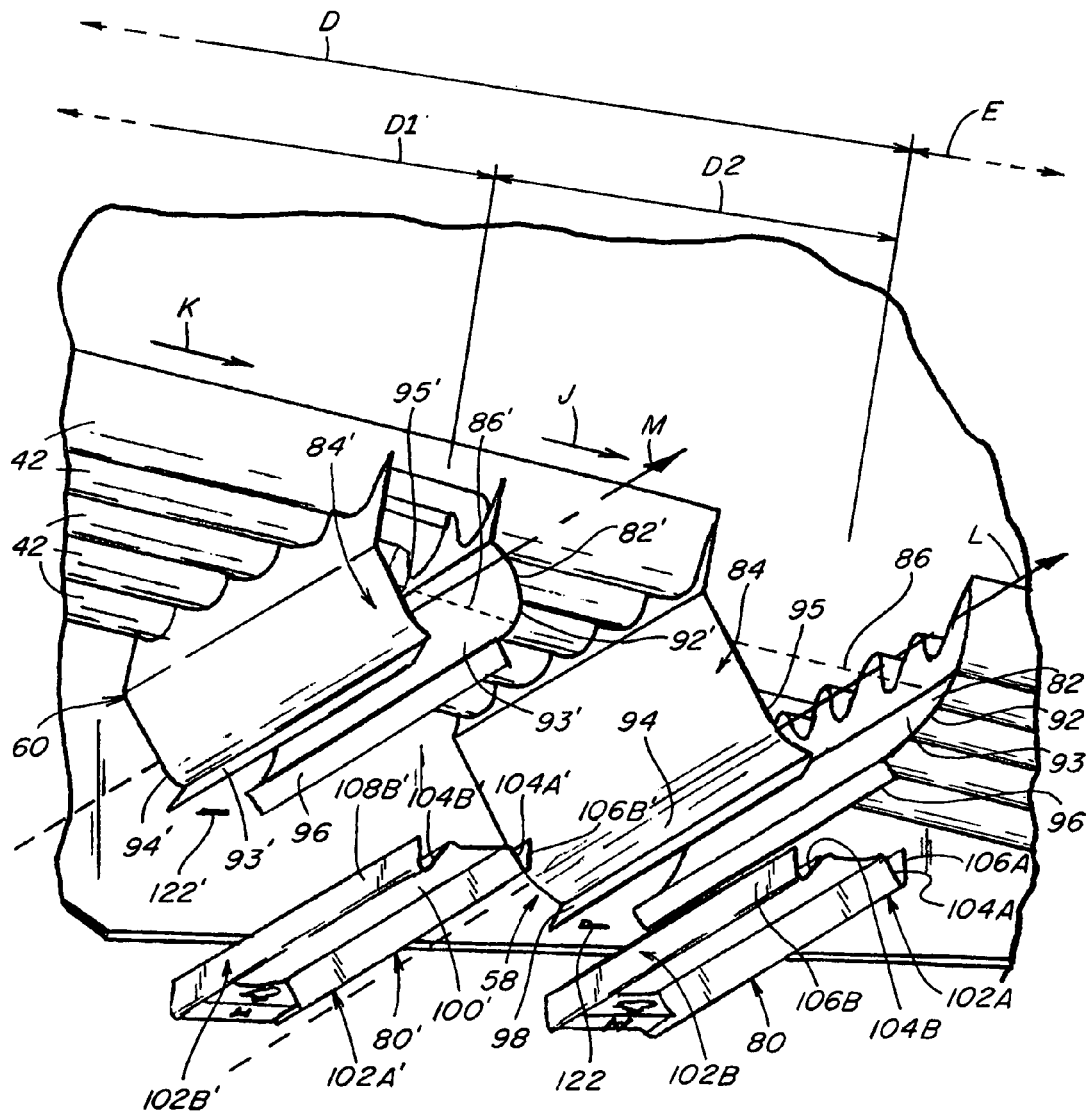
FIG. 6 is perspective view, partly in cutaway, from a point below the clean grain and tailings conveying system, near the rear end thereof, looking somewhat forwardly and across the bottom of the clean grain and tailings conveying system.

In accordance with the present invention, the clean grain auger trough 58 is constructed to have a clean-out door 80 that extends along substantially the entire length of such auger trough 58 between trough sidewalls 82 and 84. As best shown in FIG. 6, trough sidewalls 82 and 84 are spaced from one another to define a channel 86 therebetween that is open at its top to permit grain to fall into such channel 86 from the clean grain portions of the collecting troughs 42 as augers 62 operate in such collecting troughs to convey the clean grain along such collecting troughs towards the clean grain auger trough 58. Preferably, each of the trough side walls 82 and 84 have respective, arcuately shaped portions 92 and 94, with respective inner surfaces 93 and 95, that depend to respective tab or wing flanges or portions 96 and 98 disposed on opposite sides of the channel 86. Such arcuately shaped portions 92 and 94 typically extend downwardly and somewhat inwardly towards one another and therefore have a somewhat concave configuration, from top to bottom, relative to channel 86.

Figure 7:
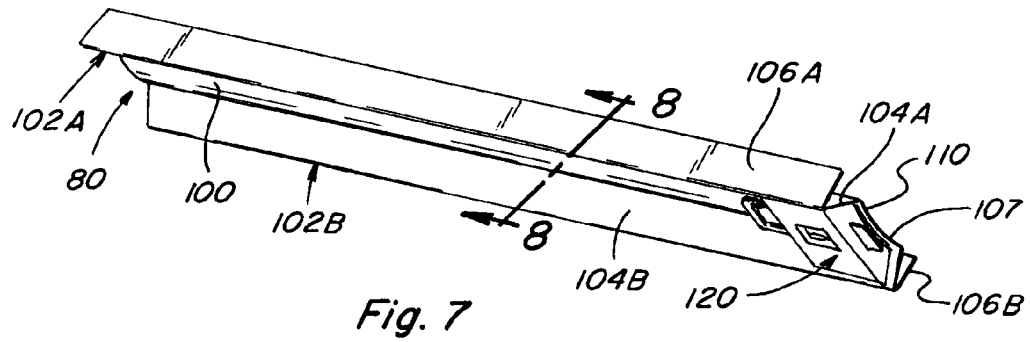
FIG. 7 is a perspective view of the auger trough clean-out door of the clean grain auger of FIG. 6.
Figure 8:
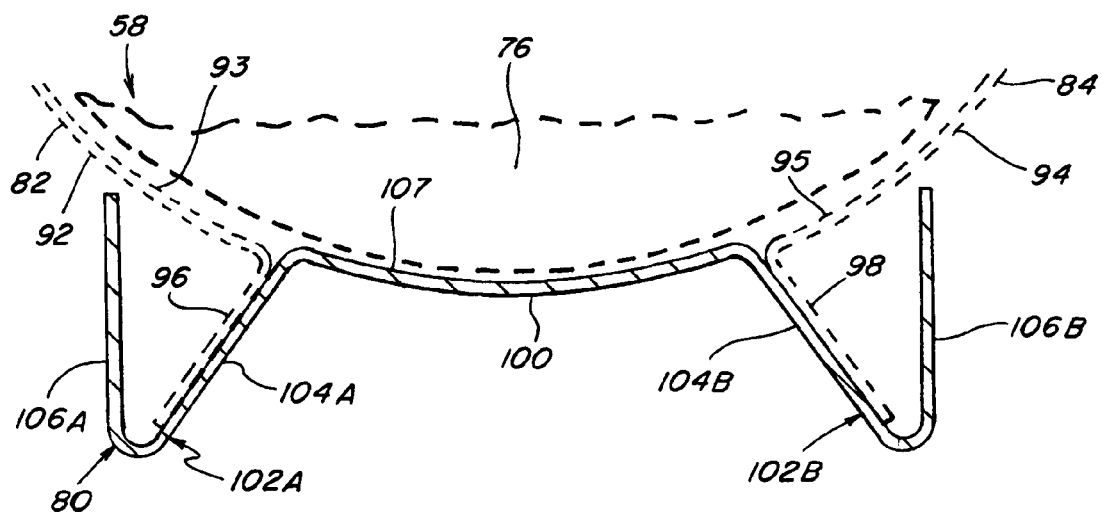
FIG. 8 is a sectional view taken along cut 8-8 of FIG. 7, also showing in phantom the side walls of the clean grain auger trough with which the clean-out door is complementarily engageable as well as the auger that extends through the clean grain auger trough.

FIGS. 6-8 depict in greater detail a preferred embodiment of a clean-out door 80, which clean-out door 80, sometimes hereinafter referred to more specifically as door panel 80, is preferably configured to have an elongated web portion 100 with side wing portions 102A and 102B extending along the sides thereof. The side wing portions 102A and 102B include abutment walls 104A and 104B configured to abut inner surfaces of wing flanges 96 and 98 of side walls 82 and 84, and fold-back portions 106A and 106B which are folded back over the bottoms of the wing flanges 96 and 98 towards side walls 82 and 84 to form a bottom cap area over the bottoms of such wing flanges 96 and 98 when the clean-out door 80 is mated with the side walls 82 and 84 of clean grain auger trough 58, as depicted in FIG. 8. The upper surface 107 of web portion 100, which is preferably of an arcuate, concave shape relative to channel 86 along the length of the door panel 80, forms a bottom of channel 86 and preferably is generally aligned with the inner surfaces 93 and 95 of side walls 82 and 84 to define a relatively smooth and uniform course through the auger trough 58 for the operation of the auger 76 therein.

Figure 9:
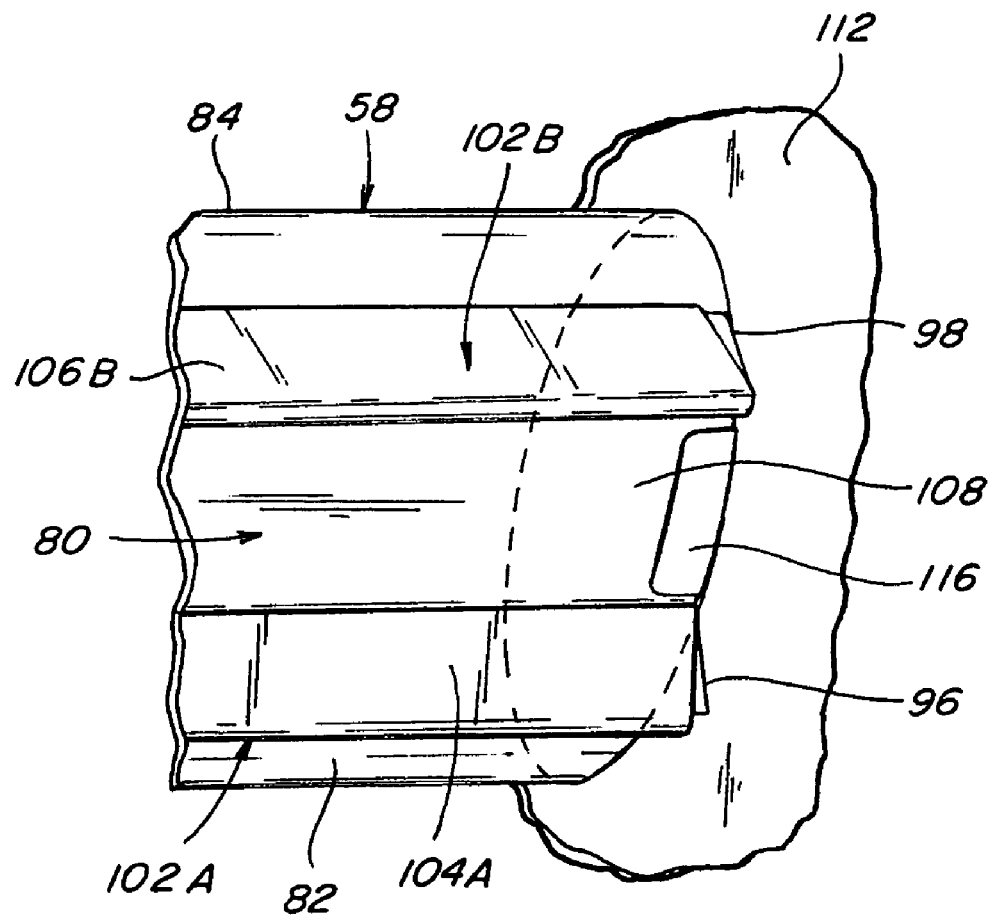
FIG. 9 is a perspective view of one end portion of the clean-out door of FIG. 7 as such end portion is complementarily engaged with a first sidesheet of the combine.
Figure 10:
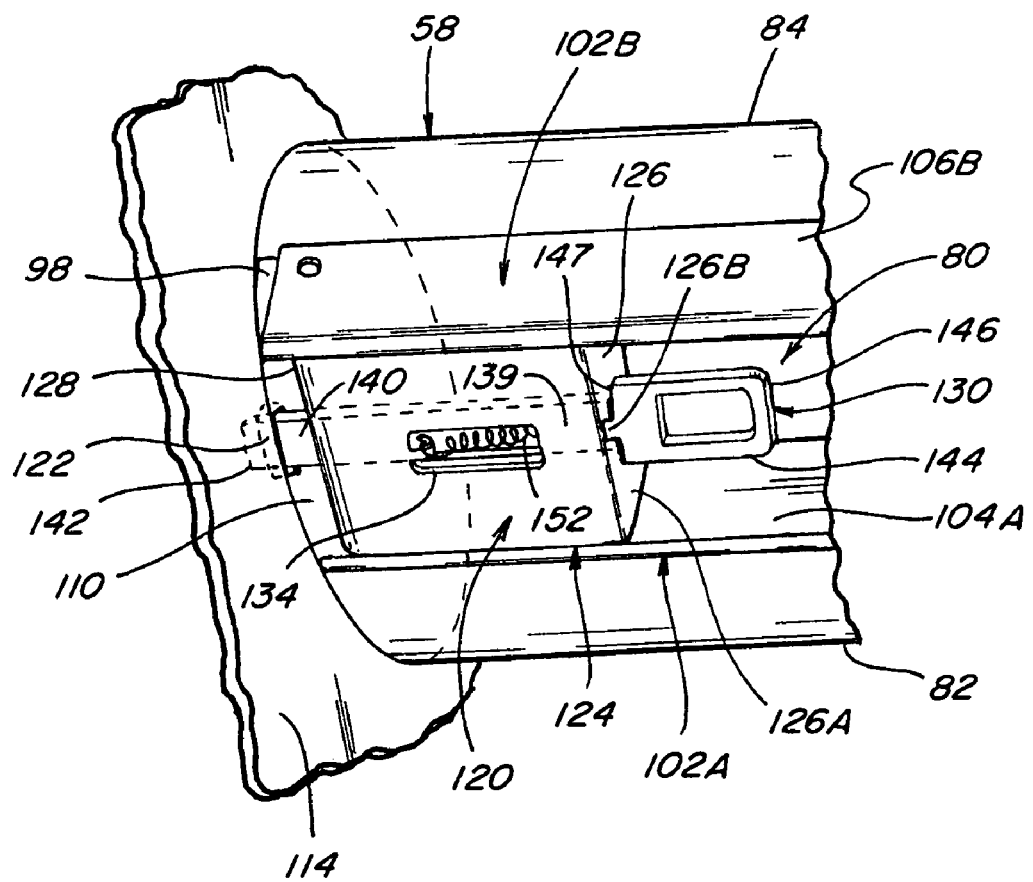
FIG. 10 is a perspective view of the other end portion of the clean-out door of FIG. 7 as such end portion is complementarily engaged with the second sidesheet of the combine.

The opposite end portions 108 and 110 of the clean-out door 80 are configured to abut, and preferably to be complementarily engageable with, opposed sidesheets 112 and 114 of the combine 10, as better depicted in FIGS. 9-10, which figures show the opposite end portions 108 and 110 when the installed clean-out door 80 is viewed from beneath the combine 10, looking from approximately the center of the combine towards the opposite end portions 108 and 110. The complementary engagement features of end portion 108 and sidesheet 112 form a first engagement pairing and the complementary engagement features of end portion 110 and sidesheet 114 form a second engagement pairing.

As shown in FIG. 9, in one preferred embodiment of a first engagement pairing, first end portion 108 of clean-out door 80 may be configured to be engageable with an engagement feature associated with sidesheet 112, such as a projecting flange 116 on sidesheet 112, and to rest upon such projecting flange 116.

As shown in FIG. 10, in one preferred embodiment of a second engagement pairing, second end portion 110 of clean-out door 80 may have associated therewith a mating mechanism 120 for securing the door panel 80 in place during harvesting operations, which mating mechanism 120 may take the form of a latch mechanism that is complementarily engageable with a latch feature on sidesheet 114, such as slot 122 in sidesheet 114, which slot 122 is also noted in FIG. 6.

As may be observed from FIGS. 10-12, which figures depict one form of mating mechanism 120 from among many possible forms that could be employed, the mating mechanism 120, hereinafter often referred to more specifically as latch mechanism 120, may include a fixed latch plate 124 having an inner end 126 and an outer end 128 and being disposed between the side wing portions 102A and 102B of clean-out door 80 near second end portion 110 thereof as well as an associated sliding latch plate 130 complementarily configured to be assemblably engageably associated with fixed latch plate 124 to be slidably movable within a channelized area 132 generally adjacent to and above a central portion 133 of the fixed latch plate 124 below the bottom of web portion 100 of clean-out door 80. As best observed from FIGS. 11 and 12, fixed latch plate 124 includes a central portion 133, extending between the side wing portions 102A and 102B of clean-out door 80 in FIG. 10, with a generally centered aperture 134 extending vertically therethrough and end cap portions 126A and 128A at respective ends 126 and 128. Each of the end cap portions 126A and 128A extends upwardly from the central portion 133 and has a respective slot 126B or 128B therethrough sized to accommodate and to form a guide for sliding latch plate 130 when such sliding latch plate is assembled with fixed latch plate 114, as will be further addressed hereinafter. The central portion 133 also has a tang 136 projecting into the aperture 134 from the outer edge 138 thereof and upwardly from the central portion 133, the purpose of which tang 136 will likewise be further addressed hereinafter.

Sliding latch plate 130 includes a central body portion 139 with a first, outer end 140 forming or having a latch plunger 142 thereon, a second, inner end 144 forming or having a shouldered pull 146 thereon, including shoulders 147, and an aperture 148, similarly shaped but slightly larger in size than aperture 134 of fixed latch plate 124, extending vertically through the center body portion 139 of sliding latch plate 130, with a tab connector 150 extending into the aperture from the pull end of the aperture 148 and projecting downwardly, the purpose of which will be further addressed hereinafter.

Figure 11:
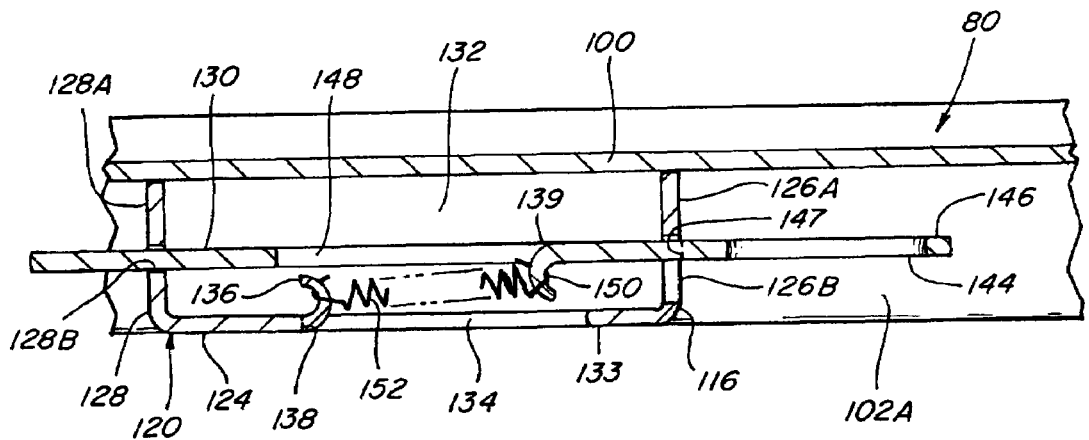
FIG. 11 is a sectional view, taken generally in a central vertical plane through the elements of FIG. 10.
Figure 12:
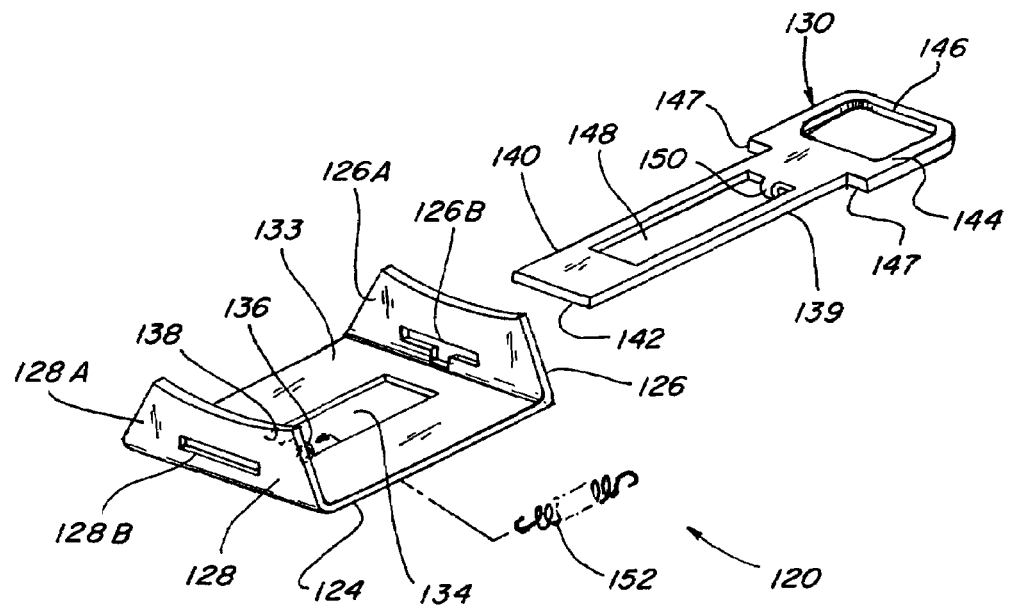
FIG. 12 is an exploded perspective view of elements of the clean-out door depicted in FIGS. 10 and 11.

As best shown in FIG. 11, sliding latch plate 130 and the slots 126B and 128B of fixed latch plate 124 are complementarily sized and slots 116B and 118B so positioned on respective end caps 116 and 118 that the latch plunger 142 on the outer end 140 of sliding latch plate 130 can be inserted through both slot 126B and slot 128B and tab connector 150 can be moved through slot 116B to position the latch plunger 142 extending beyond the outer end 118 of fixed latch plate 124, with the shoulders 147 on the inner end portion 144 of sliding latch plate 130 abutting the end cap 126A of fixed latch plate 124, with the latch pull 146 projecting inwardly towards the center of the combine 10 beyond the inner end 126 of fixed latch plate 124, and with aperture 148 of sliding latch plate 130 overlapping the aperture 134 of fixed latch plate 124. When the fixed and sliding latch plates 124 and 130 are so positioned, a spring 152 can be connected extending between tang 136 of fixed latch plate 124 and tab projection 150 of sliding latch plate 130 to bias and hold sliding latch plate 130 in such position with shoulders 147 abutting end cap 116A of fixed latch plate 124 and latch plunger 142 extending beyond outer end 128 of fixed latch plate 124 to be able to extend, as depicted in FIG. 10, into slot 122 on sidesheet 114, such position of the sliding latch plate being considered the latched or locked position. Pull 146 can be grasped by a user and moved inwardly beneath the bottom of web portion 100 of clean-out door 80, against the bias of spring 152, to cause sliding latch plate 130 to be slidably moved inwardly beneath the bottom of web portion 100 of clean-out door 80 sufficiently to cause latch plunger 142 of sliding latch plate 130 to be withdrawn from slot 122 in sidesheet 114.

Figure 13:
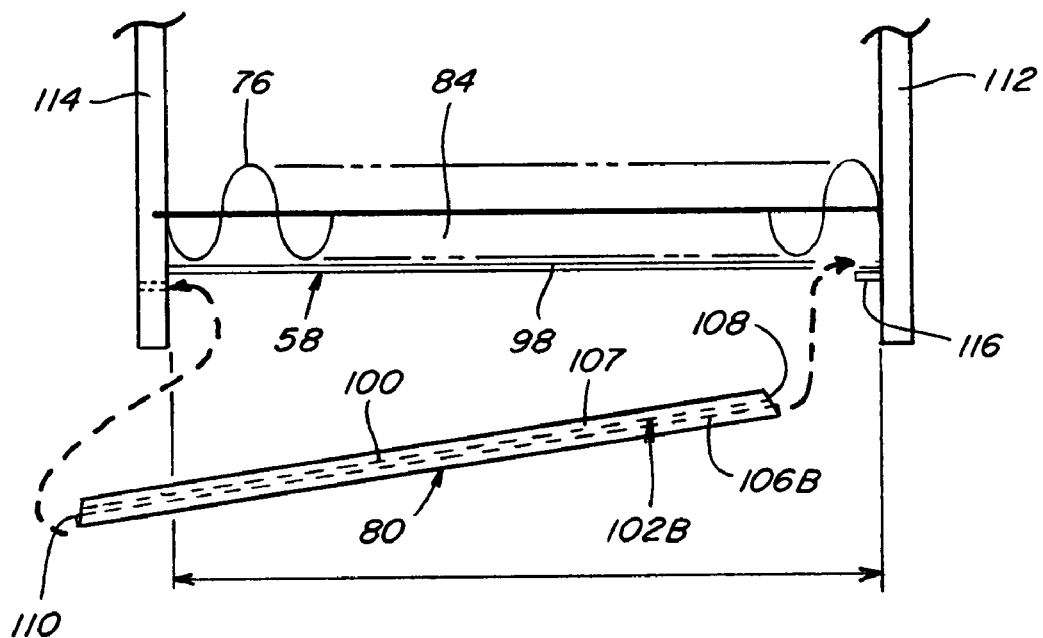
FIG. 13 is a simplified view illustrating the manner in which the clean-out door of FIGS. 6-12 may be installed by a user from the side of the combine, with a portion of the side walls of the clean grain auger trough as well as the auger within the clean grain auger trough also being depicted in order to show the relative locations thereof relative to the clean-out door.
Figure 14:
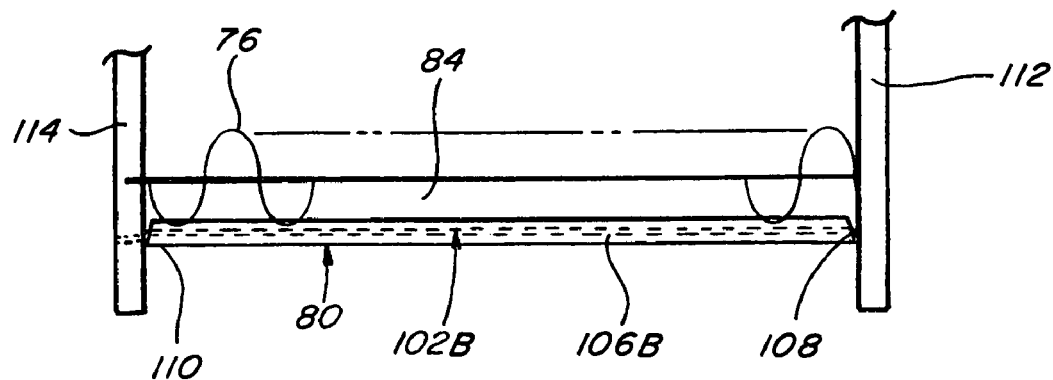
FIG. 14 is a simplified view, somewhat similar to FIG. 13, illustrating the position of the clean-out door when it has been installed.

Preferably, to facilitate the engagement of clean-out door 80 with side walls 82 and 84 of clean grain auger trough 58 and the placement and removal of such clean-out door 80 between sidesheets 112 and 114, the ends of side wing portions 102 and 104 are beveled or chamfered to permit to permit easier upward and downward rotation of the clean-out door 80 as it is moved into and out of engagement with the side walls 82 and 84 and sidesheets 112 and 114. FIG. 13 illustrates the manner in which clean-out door 80 can be moved into engagement with the side walls 82 and 84 of clean grain auger trough 58 and with sidesheets 112 and 114 to form a base for clean grain auger trough 58 and, through operation of latch mechanism 120, be latched in place, with FIG. 14 depicting clean-out door 80 as latched in place.

It should be appreciated that the particular engagement and mating features and mechanisms discussed hereinbefore are but example of many, various engagement and mating mechanisms or devices that could be employed in or with engagement pairings to hold the clean-out door 80 in position for use during harvesting operations. Other mechanisms and devices, including guide members and connectors for maintaining the clean-out door 80 in engagement with the side walls 82 and 84 of clean grain auger trough 58 to form the base along essentially the entirety of the clean grain auger trough 58 between sidesheets 112 and 114 during sharvesting operations, could be readily employed to much the same effect.

Figure 17:
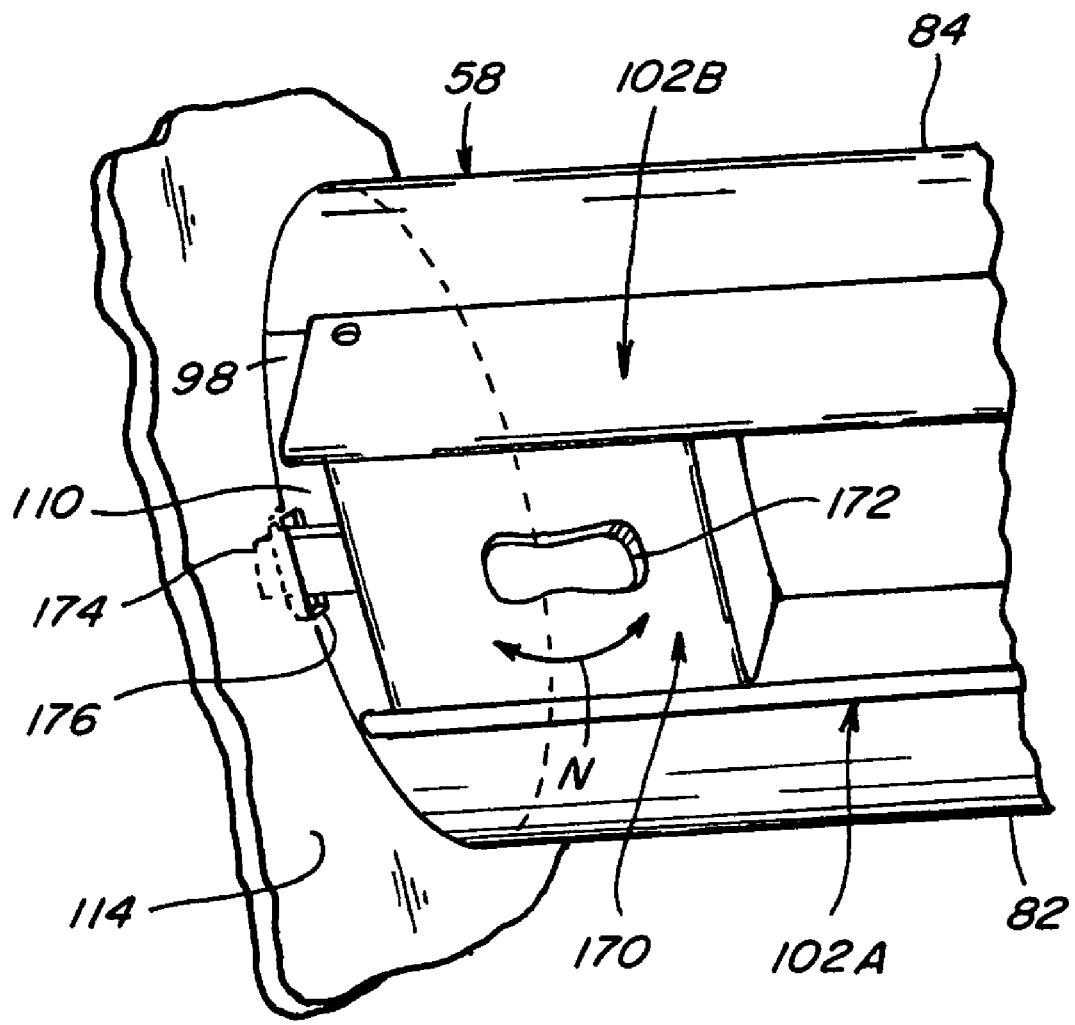
FIG. 17 is a perspective view; similar to FIG. 10, but illustrating the use of alternative complementary engagement and mating features and elements of the clean-out door and the sidesheet at the same end of the clean-out door as depicted in FIG. 10.

For example, as depicted in FIGS. 15-17, an end sheet 160 with a slot 162 therein could be provided at the first end portion 108 of door panel 80 and sized to receivably engage therein a projecting tab 164 on or associated with sidesheet 112, which tab 164 may be bent or angled downwardly at its outer end to facilitate engagement between door panel 80 and tab 164 as the door panel 80 is being rotated upwardly and downwardly about first end portion 108 during installation and removal of door panel 80. The bend in tab 164 can also serve to help maintain the door panel in place adjacent to sidesheet 112 during harvesting operations. A door-latch type of latch mechanism 170, including a latch knob 172 rotatably operable by a user, as denoted by arrow N, to control the projection of latch plunger 174 into a slot 176 on sidesheet 114, could also be easily and advantageously provided at the second end portion 110 of door panel door 80 and constructed and operated in well known manners.

Additionally, although removal and re-installation of the clean-out door 58 might be somewhat more difficult than with the several engagement and mating features and mechanisms discussed hereinabove, the clean-out door could simply employ bolts or like connectors through end caps to attach the clean-out door 80 to the opposed sidesheets 112 and 114 or could utilize connectors to secure the side wing portions 102A and 102B to side walls 82 and 84 of the clean grain auger trough 58 near the opposite ends 108 and 110 of clean-out door 80, which mechanisms and connectors could be accessed generally from the sides of the combine.

In light of the foregoing, it should be appreciated that the particular forms of the interengageable engagement and mating features and mechanisms forming parts of the engagement pairings are not considered to be necessarily critical to the present invention, but it should also be understood that certain particular features and mechanisms may afford greater or lesser advantages in terms of their ease of use and that those particular features and mechanisms that would provide greater ease of use would typically be considered more preferable.

In such regard, the mating features and mechanisms of the embodiment of FIGS. 6-12 are illustrative of mating features and mechanisms that exhibit ease of use. When a clean-out door 80 is employed with a flange 116 on sidesheet 112 and a latch mechanism 120 associated with a slot 122 on the opposite sidesheet 114, and is installed to be in the latched position as denoted in FIG. 14, the clean-out door 80 can be easily and quickly removed for clean out of the clean grain auger trough 58. A user can, from the side of the combine, reach beneath clean grain auger trough 58, grasp pull 146, and move pull 146 away from sidesheet 104 inwardly towards the center of combine 10. Such action thereby causes sliding latch plate 130 to be slidably moved within channel 132 below web portion 100 of clean-out door 80 to withdraw latch plunger 142 from slot 122 of sidesheet 104, thus allowing the latch end 110 of clean-out door 80 to be rotated downwardly by the user to disengage such clean-out door 80 from the sidewalls 82 and 84 at such end of the clean grain auger trough 58. The user can then easily pull clean-out door 80 towards him to remove the opposite end 108 of clean-out door 80 from its rest on projecting flange 116 of sidesheet 102 and to disengage the side wing portions 102A and 102B from the opposite end 108 of the clean-out door 80 from side walls 82 and 84 of clean grain auger trough 58. When such removal is effected, crop and other remnants remaining along the bottom of the clean grain auger 58 are allowed to fall to the ground, and the clean-out door 80 can be cleaned and scraped to remove any material remaining encrusted thereto or thereon. If desired, pressurized streams of air or water can be directed along the sidewalls 82 and 84, and manual cleaning of the interiors of such sidewalls can be undertaken, if required.

The tailings auger trough 60 may be similarly formed and constructed to employ a similar or like clean-out door 80' with similar or alternative features. In such regard, in the figures herewith items or features having identification markings that include a prime designation therewith, e.g., 82', are highly similar to, if not essentially identical to, items or features that have the same numerical identification, but without the prime designation, e.g. 82. Oftentimes, the tailings auger trough 60 may be of a somewhat different or smaller size than the clean grain auger trough 58, as a consequence of which there may be, but need not necessarily be, some sizing differences in the trough side walls 82' and 84' or in the clean-out door 80'. In general, however, the principals and features of the clean-out door 80 discussed hereinabove may be also applied to clean-out door 80'. For purposes of uniformity of parts, clean-out doors 80 and 80' may be designed and constructed so as to be essentially identical to one another, with side walls 82, 84 and 82', 84' being configured slightly differently from one another to permit use of the same clean-out door construction with both of clean grain auger trough 58 and tailings auger trough 60.

Although the foregoing discussion has addressed the use of clean-out auger trough doors principally in or in conjunction with the clean-grain and tailings conveying system 12, it should be understood and appreciated that auger trough clean-out doors could also be utilized in or with other types or forms of clean grain and tailings conveying systems, including systems such as system 12" which is generally depicted in FIG. 2. Like the clean grain and tailings conveying system 12 of FIG. 1, clean grain and tailings conveying system 12" operates to convey the clean grain to a clean grain auger trough 58 and the tailings to a tailings auger trough 60, but utilizes a configuration wherein the clean grain pan and the tailings pan are separate pans that may include separate collecting troughs with augers extending therethrough for conveying the materials that fall into such pans from the cleaning system 20 to the clean grain auger trough 58 and the tailings auger trough 60. In FIG. 2 herewith, items or features having identification markings that include a double prime designation therewith, e.g., 80", are highly similar to, if not essentially identical to, items or features that have the same numerical identification, but without the prime designation, e.g., 80. From the foregoing descriptions and discussions, particularly in conjunction with the drawings, those skilled in the art should be able to readily determine and make such modifications or changes to the clean-out door 80 discussed hereinabove as may be considered appropriate or desirable to effect the use of such a clean-out door in or in conjunction with system 12" or with other clean grain and tailings conveying systems.

Additionally, inasmuch as the use of clean grain auger troughs and tailings auger troughs is not limited to the particular clean grain and tailings systems discussed hereinabove, but can extend to other types of clean grain and tailings conveying systems as well, including systems that do not utilize collecting troughs such as are included in systems 12 and 12", it should be appreciated that the subject invention is likewise not limited to use in or with the particular clean grain and tailings conveying systems discussed hereinabove and can be generally and readily adapted to and practiced with auger troughs in many different systems and for various applications, all within the intended scope of this invention.

In light of all the foregoing, it should thus be apparent to those skilled in the art that there has been shown and described a construction for facilitating the clean out of the auger troughs of clean grain and tailings conveying systems of agricultural combines, including, more particularly, an auger trough and associated auger trough clean-out door. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A clean-out door for an auger trough of a clean grain and tailings conveying system of an agricultural combine wherein the auger trough has depending side walls that extend laterally across the combine between opposed sidesheets, said clean-out door comprising a generally rigid door panel having a length essentially the same as the length of the auger trough between the opposed sidesheets, wherein said door panel includes a generally central elongated web portion disposed laterally between a pair of side wing portions, said side wing portions configured to be engageable with the depending side walls of the auger trough to define a door panel trough formed by the side walls and said door panel, said door panel configured to be complementarily engageable with the depending side walls to substantially close the bottom of the auger trough during certain times and to be disengagable from the depending side walls at other times, said door panel having opposite ends configured to generally abut the opposed sidesheets and to be generally removably securable in place when said door panel is engaged with the side walls and positioned extending between the sidesheets to maintain such door panel in place, said door panel having a mating mechanism adjacent at least one of said opposite ends thereof and accessible to and operable by a user from the side of the combine to secure said door panel in place in close abutment with the side walls of the auger trough and extending between the sidesheets, said mating mechanism further accessible to and operable by a user from the side of the combine to enable removal by the user of said door panel from the position extending between the sidesheets and from close abutment with the side walls of the auger trough, whereby, from the side of the combine, said door panel is installable by a user to form the base of the auger trough during harvesting operations and is removable at other times to facilitate clean out of the auger trough.

2. The auger trough clean-out door of claim 1 wherein the depending side walls include wing flanges extending along the lower portions thereof and wherein said side wing portions of said door panel are complementarily engageable with the wing flanges of the depending side walls of the auger trough to effectively close the bottom of the auger trough.

3. The auger trough clean-out door of claim 2 wherein the wing flanges of the side walls of the auger trough have inner surfaces and wherein said side wing portions of said door panel include abutment walls configured to abut the inner surfaces of the wing flanges and fold-back portions that are folded back over the bottoms of the wing flanges of the side walls of the auger trough to form a bottom cap thereover when said door panel is installed in engagement with the side walls.

4. The auger trough clean-out door of claim 1 wherein the side walls of the auger trough define a channel therebetween and at least portions of such side walls have a concave configuration relative to the channel between such side walls and wherein said web portion of said door panel has an upper surface of a concave configuration relative to the channel between such side walls.

5. The auger trough clean-out door of claim 4 wherein the side walls of the auger trough have inner surfaces and wherein said upper surface of said web portion of said door panel forms the bottom of the channel between the side walls of the auger trough and is generally alignable with the inner surfaces of the side walls of the auger trough to define a generally smooth and uniform course through the auger trough.

6. The auger trough clean-out door of claim 1 wherein a first end of said opposite ends of said door panel is complementarily engageable with a first of the opposed sidesheets and a second end of said opposite ends of said door panel is complementarily engageable with a second of said opposite sidesheets.

7. The auger trough clean-out door of claim 6 wherein said first end of said opposite ends of said door panel and the first sidesheet have associated therewith complementary engagement features forming a first engagement pairing and said second end of said opposite ends of said door panel and the second sidesheet have associated therewith complementary engagement features forming a second engagement pairing.

8. The auger trough clean-out door of claim 7 wherein the first sidesheet includes a projecting flange thereon, said first end of said door panel configured to complementarily engage and rest upon the projecting flange.

9. The auger trough clean-out door of claim 7 wherein the first sidesheet has a projecting tab associated therewith and wherein said door panel includes an end plate with a slot therethrough at said first end of said door panel, the projecting tab and said slot through said end plate being complementarily sized and configured for engagement therebetween.

10. The auger trough clean-out door of claim 9 wherein said projecting tab includes a downward bend to accommodate insertion of said projecting tab into said slot through said end plate while said door panel is inclined downwardly from said first end portion to said second end portion thereof and to at least loosely operably secure said door panel to the first sidesheet when said end plate is moved to abut the first sidesheet with said door panel disposed generally transverse to the first sidesheet.

11. The auger trough clean-out door of claim 7 wherein the second sidesheet includes a first mating mechanism thereon and wherein second end portion of said door panel has a second mating mechanism thereat, said second mating mechanism including a mating element complementarily engageable with the first mating mechanism on the second sidesheet when said first end of said door panel is complementarily engaged with the first sidesheet.

12. The auger trough clean-out door of claim 11 wherein said first end of said door panel is positionable by a user from the side of the combine to effect complementary engagement between said first end of said door panel and the first sidesheet and to permit upward rotational movement of said second end of said door panel about said first end of said door panel to effect complementary engagement of said wing portions of said door panel and the side walls of the auger trough and complementary engagement of said mating element of said second mating mechanism of said door panel with the first mating mechanism on the second sidesheet.

13. The auger trough clean-out door of claim 11 wherein the first mating mechanism of the second sidesheet is a plunger slot, said mating mechanism is a latch mechanism, and said second mating element is a latch plunger, said latch mechanism operable by a user to effect the movement of said latch plunger into and out of the plunger slot when said latch plunger and the plunger slot are generally aligned with one another.

14. The auger trough clean-out door of claim 13 wherein said latch plunger and the plunger slot are generally alignable with one another when said first end portion of said door panel is engaged with the first sidesheet, said side wing portions of said door panel are engaged with the side walls of the auger trough, and said second end portion of said door panel abuts the second sidesheet, said latch mechanism operable by user from the side of the combine when said latch plunger and the plunger slot are generally aligned with one another to latch said door panel in a latched position with said latch plunger extending into the plunger slot.

15. The auger trough clean-out door of claim 13 wherein said latch mechanism is operable by a user from the side of the combine when said door panel is in a latched position to effect withdrawal of said latch plunger from the plunger slot of the second sidesheet to permit the disengagement of said side wing portions of said door panel from the side walls of the auger trough and said first end portion from the first sidesheet and removal of said door panel from the auger trough.

16. The auger trough clean-out door of claim 13 wherein said latch mechanism includes a pull operable by the user to operate said plunger, said pull biased to maintain said plunger in an extended condition extending into the plunger slot when said latch plunger and the plunger slot are generally aligned with one another, said pull movable by the user to effect withdrawal of said latch plunger from the plunger slot of the second sidesheet so as to permit the disengagement of said side wing portions of said door panel from the side walls of the auger trough and said first end portion from the first sidesheet and removal of said door panel from the auger trough.

17. The auger trough clean-out door of claim 13 wherein said latch mechanism includes a knob operable by a user to effect movement of said latch plunger between an extended and a retracted position.

18. An auger trough and clean-out door construction for an auger trough that extends between opposed first and second sidesheets, said construction comprising a pair of spaced side walls extending between the opposed sidesheets, said side walls defining a channel therebetween, a generally rigid door panel having a length essentially the same as the length of said side walls, said door panel configured to be complementarily engageable, during certain times, with said side walls to substantially close the bottom of said channel between said side walls to define an auger trough, and to be disengagable from said side walls at other times to open said auger trough along the bottom thereof, said door panel having opposite first and second ends configured to generally abut the opposed first and second sidesheets and to be generally removably securable in place when said door panel is engaged with said side walls and positioned extending between the sidesheets to maintain said door panel in place, at least portions of such side walls have a generally concave configuration relative to the channel between such side walls and said side walls include wing flanges with inner surfaces extending along the lower portions of said side walls, said door panel includes a generally central elongated web portion disposed laterally between a pair of side wing portions, said web portion having an upper surface of a generally concave configuration relative to the channel between said side walls, said side wing portions of said door panel including abutment walls configured to abut said inner surfaces of said wing flanges when said door panel is installed in engagement with said side walls, said upper surface of said web portion of said door panel being generally alienable with the inner surfaces of said side walls to define a generally smooth and uniform course through the auger trough when said door panel is installed in engagement with said side walls, said door panel having a mating mechanism adjacent at least one of said opposite ends thereof and accessible to and operable by a user from beyond the sidesheet at such door panel end, defined as the access end, to secure said door panel in place in close abutment with the side walls of the auger trough and extending between the sidesheets, said mating mechanism further accessible to and operable by a user from said access end to enable removal by the user of said door panel from the position extending between the sidesheets and from close abutment with the side walls of the auger trough, whereby, from said access end, said door panel is installable by a user to form the base of the auger trough and is removable at other times to facilitate clean out of the auger trough.

19. The auger trough and clean-out door construction of claim 18 wherein said first end of said opposite ends of said door panel and the first sidesheet have associated therewith complementary engagement features forming a first engagement pairing and said second end of said opposite ends of said door panel and the second sidesheet have associated therewith complementary engagement features forming a second engagement pairing, said first end of said door panel positionable by a user from beyond said access end to effect complementary engagement between said complementary engagement features forming said first engagement pairing and to permit upward rotational movement of said second end of said door panel about said first end of said door panel to position said wing portions of said door panel and said side walls in complementary engagement with one another and with said second end of said door panel abutting the second sidesheet, such position defining a latching position for said door panel, said complementary engagement features of said second engagement pairing including said mating mechanism, said mating mechanism operable by a user from beyond said access end to effect complementary engagement of said complementary engagement features forming said second engagement pairing to secure said door panel in said latching position.

20. The auger trough and clean-out door construction of claim 19 wherein said mating mechanism is operable by a user from beyond said access end when said door panel is secured in said latching position to effect disengagement of said complementary engagement features of said second engagement pairing to permit downward rotational movement of said second end of said door panel about said first end of said door panel, disengagement of said door panel and the side walls from one another, and disengagement of said complementary engagement features forming said first engagement pairing.

* * * * *